(12) United States Patent
Froschle

(10) Patent No.: US 8,360,472 B2
(45) Date of Patent: Jan. 29, 2013

(54) VEHICLE SUPPORTING STRUCTURE FOR A MOTOR VEHICLE

(75) Inventor: Mathias Froschle, Ostfildern (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 390 days.

(21) Appl. No.: 12/559,536

(22) Filed: Sep. 15, 2009

(65) Prior Publication Data

US 2010/0078925 A1    Apr. 1, 2010

(30) Foreign Application Priority Data

Oct. 1, 2008 (DE) .......................... 10 2008 049 985

(51) Int. Cl.
*B60R 21/13* (2006.01)
(52) U.S. Cl. ............... 280/756; 296/193.02; 296/190.03
(58) Field of Classification Search ............. 296/193.02, 296/190.03; 280/756
See application file for complete search history.

(56) References Cited

U.S. PATENT DOCUMENTS

| 6,902,225 B2 * | 6/2005 | Schmitt et al. ............. 296/180.1 |
| 7,338,076 B2 | 3/2008 | Hamamoto et al. |
| 2005/0140129 A1 | 6/2005 | Miki et al. |
| 2006/0273628 A1 | 12/2006 | Wolkersdorfer et al. |
| 2008/0061542 A1 | 3/2008 | Froschle |

FOREIGN PATENT DOCUMENTS

| DE | 10 2004 016362 | 10/2004 |
| DE | 60 2004 002 660 | 8/2007 |
| EP | 1 728 707 | 3/2006 |
| JP | 2006160143 | 6/2006 |
| JP | 2008137411 | 6/2008 |

* cited by examiner

*Primary Examiner* — Glenn Dayoan
*Assistant Examiner* — Melissa A Black
(74) *Attorney, Agent, or Firm* — Gerald E. Hespos; Michael J. Porco

(57) ABSTRACT

A vehicle supporting structure (1) is provided for a motor vehicle having either a fixed roof or a movable roof. The vehicle supporting structure (1) has lateral side parts (16, 17) adjacent to the respective body pillar (2, 3), and a transverse support (6, 6') arranged between the side parts (16, 17). A connecting component (9, 10) is inserted between each body pillar (2, 3) and the associated side part (16, 17), and the end (20) of each side part (16, 17) that faces away from the body pillar has a receiving part (21, 22, 21', 22') to which the transverse support (6, 6') is fastened.

11 Claims, 2 Drawing Sheets

VEHICLE SUPPORTING STRUCTURE FOR A MOTOR VEHICLE

CROSS-REFERENCE TO RELATED APPLICATIONS

This application claims priority under 35 USC 119 to German Patent Application No. 10 2008 049 985.4 filed on Oct. 1, 2008, the entire disclosure of which is incorporated herein by reference.

BACKGROUND OF THE INVENTION

1. Field of the Invention

The invention relates to a vehicle supporting structure for a motor vehicle.

2. Description of the Related Art

EP 1 728 707 A2 discloses a vehicle supporting structure for a vehicle that has opposite lateral body pillars that generally are referred to as the B pillars. The supporting structure is arranged between the body pillars and opposite lateral ends of the supporting structure are fastened to the body pillars. The transverse supporting structure is of multi-part design and has two lateral side parts that are adjacent to the respective body pillar. Each lateral side part is a hollow support assembled from a plurality of sheet-metal parts. As seen from above, each side part has an arcuate profile and extends obliquely from the body pillar toward the rear of the vehicle. A hollow transverse support is arranged between the two side parts and is connected at both ends to the side parts.

DE 60 2004 002 660 T2 discloses a similar vehicle supporting structure with side parts assembled from a plurality of metal sheets and connected directly to the inner side wall in the region of the B pillar. A transverse support extends between the two side parts, and inverted U-shaped roll bars are placed on the transverse support. Connecting clips also are provided on the inner side of the B pillar and are intended to be used for mounting a convertible top.

It is the object of the invention to provide a vehicle supporting structure that is suitable for vehicles having a fixed, immovable roof or for a convertible.

SUMMARY OF THE INVENTION

The invention relates to a vehicle supporting structure that has an additional connecting component attached between the body pillar and the correspondingly assigned side part. The connecting component can be designed, depending on requirements, merely as a spacer in a vehicle having a fixed roof or as a convertible top bearing for a vehicle having a movable roof. By contrast, the side parts can be used unchanged. The additional receiving part for the connection of the transverse support to the side parts enables the receiving part to be configured in accordance with requirements since it is intended to serve either for the connection to a transverse support, as in EP 1 728 707 A2, or to a roll bar arrangement. The use of the connecting component between each body pillar and the associated side part enables the advantageous use of parts of the transverse support structure for different types of vehicle, and also enables the body pillar to be of identical design for both types of vehicle. Consequently, the invention affords advantages for the transverse support structure and also for the vehicle supporting structure, in particular the body pillars, since the body pillars can be of identical design for two different types of vehicle (closed vehicle or convertible), at least in the region that serves for the connection of the transverse supporting structure.

The connecting component may be a convertible top bearing, and the vehicle supporting structure can be used for a convertible.

The receiving part may have an extension projecting up in the direction of the vehicle vertical axis, and the transverse support may be held on the extension at a vertical distance from the side parts. The transverse support can be attached to the vehicle at a relatively high point, which is advantageous if the transverse support is to be provided with roll bars. The transverse supporting structure therefore protrudes with the roll bars to an extent over the belt line of the convertible so that the roll bars can provide particularly good protection in the event of a vehicle overturning. The roll bars cooperate with the motor vehicle windshield frame to provide a relatively high protection space for the vehicle occupants. As an alternative, a cross-sectionally reinforced or enlarged transverse support can be fastened to the receiving parts having an extension. This applies in particular to their use with roll bars.

The height of the roll bar arrangement can be increased further if the transverse support spans the distance between the side parts in an arcuate manner.

The receiving part also may be connected to a body shell element located under the receiving part, for example to the vehicle floor or engine compartment cover in addition to the connection of the receiving part to the side part. This significantly reinforces the transverse supporting structure further.

The receiving part receives the transverse support, and a foot of the roll bar also may be fastened to or accommodated in the receiving part.

The receiving part preferably is formed without the extension if the transverse supporting structure is to be used for a closed passenger vehicle. Therefore, the receiving part ends approximately level with the second part, and the transverse support merely supports a luggage-securing means that projects into the vehicle interior, as is known for a transverse supporting structure without a receiving part from the above-described EP 1 728 707 A2.

A belt-deflecting means for the seat belt may be fastened to the side part. The transverse supporting structure is rigid and firm, and hence is particularly advantageous for fastening the belt-deflecting means.

DETAILED DESCRIPTION OF THE PREFERRED EMBODIMENTS

Figure 1:
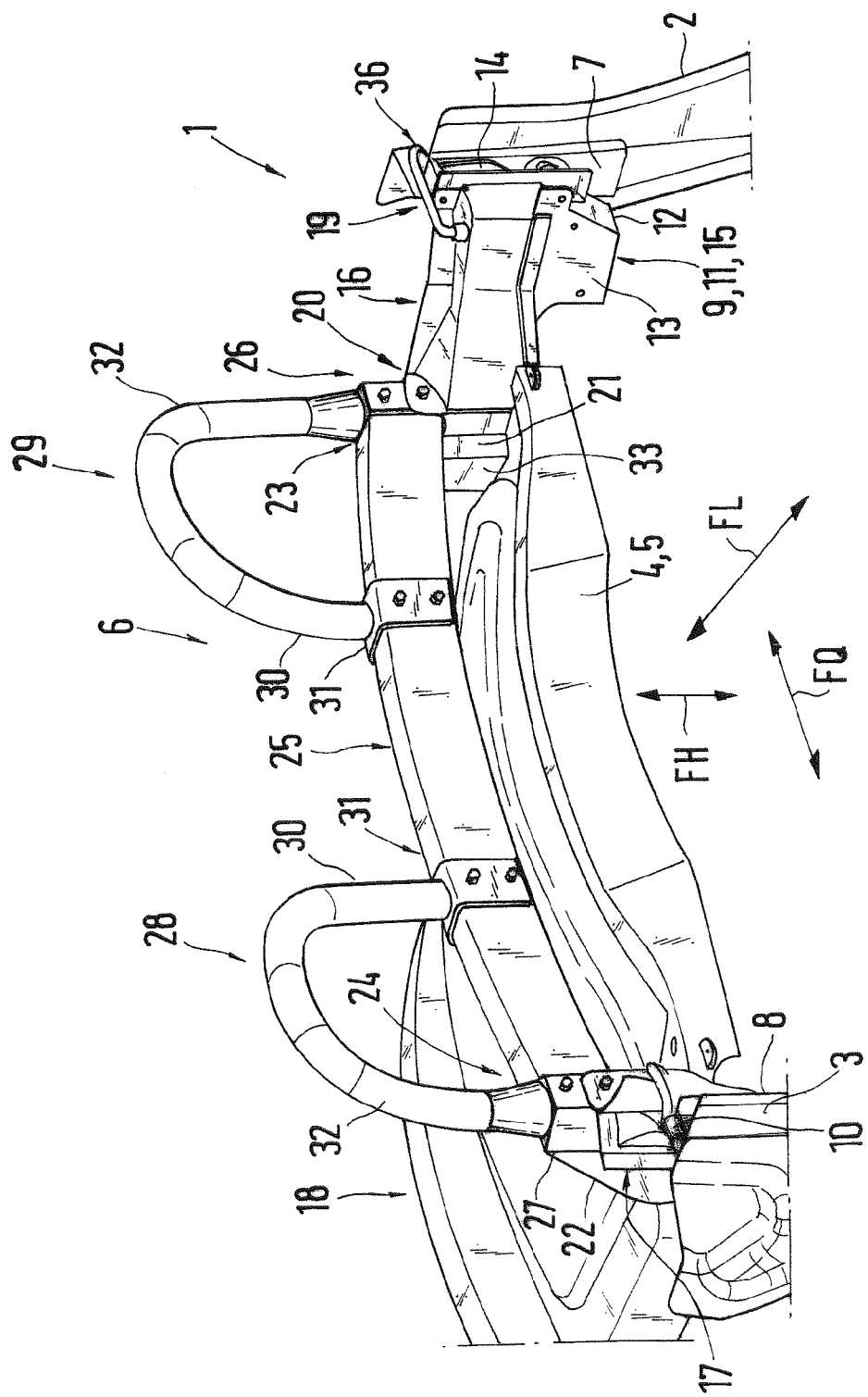
FIG. 1 is a side perspective view of a vehicle supporting structure with a transverse supporting structure for a convertible.

FIG. 1 shows part of a vehicle supporting structure 1 with lateral body pillars 2, 3 (B pillars) opposite each other at a distance measured in the vehicle transverse direction FQ. FIG. 1 also shows a body shell element 4. The motor vehicle with a vehicle supporting structure 1 of the type shown in FIG. 1 preferably is a two-seater convertible with an engine in a central engine arrangement. Accordingly, the body shell element 4 in this exemplary embodiment, is a cover 5 of an engine compartment (not illustrated) for the engine.

A transverse supporting structure 6 is oriented in the vehicle transverse direction FQ, extends between the two body pillars 2, 3 and is connected to respective inner sides 7, 8 of the body pillars 2, 3. The transverse supporting structure 6 has laterally outer connecting components 9, 10 that are connected to the respective inner sides 7, 8 of the body pillars 2, 3. The two connecting components 9, 10 are mirror images of one another so that each matches one side of the vehicle. Therefore, only the connecting component 9 is explained in detail below. The connecting component 9 is a box-like hollow support 11 as seen in the vehicle transverse direction FQ, and accordingly has a wall 12 that extends in the vehicle transverse direction FQ between an inner plate 13 and an outer plate 14 of the connecting component 9. A second wall runs in the vehicle transverse direction FQ and extends at a distance behind the wall 12 in the vehicle longitudinal direction FL, but cannot be seen in FIG. 1. The connecting component 9 is connected to the inner side 7 of the body pillar 2 either by a releasable or nonreleasable connection, depending on whether the connecting component 9 is provided as a body shell part or as a mounting part that is mounted latter to the vehicle supporting structure 1. In the embodiment of FIG. 1, the connecting component 9 is a convertible top bearing 15 in which linkage parts (not shown) are mounted movably between the two plates 13 and 14 so that a roof arrangement (not illustrated) connected to the linkage parts can be moved between a closed position and a rear storage position on the cover 5. However, the connecting component 9 may also be a separate convertible top bearing (not illustrated) that could be inserted, for example, between the two plates 13, 14.

Side parts 16, 17 of the transverse supporting structure 6 adjoin the inner plates 13 of the respective connecting components 9, 10 and are connected to the respective connecting component 9, 10 releasably or nonreleasably, depending on whether the side part is provided as a body shell part or as a mounting part. The side part 16 extends from the inner side 7 of the body pillar 2 or from the inner plate 13 of the connecting component 9 and continues obliquely rearward in the direction of a vehicle rear 18. The other side part 17 is a substantially mirror image of the side part 16. More particularly, the side part 17 also extends obliquely rearward in the direction of the vehicle rear 18. As seen in top view, the two side parts 16, 17 are arcuate. The side parts 16, 17, are hollow supports that can be assembled from sheet-metal parts or can be produced as a light-metal cast part. The connecting components 9 and 10 can be made similarly or can be an extruded profile.

Each side part 16, 17 has front and rear ends 19 and 20. The front end 19 of each side part 16, 17 is associated with the inner side 7 or 8 of the particular body pillar 2 or 3 by being fastened to the respective connecting component 9, 10. The rear end 20 of each side part 16, 17 faces the vehicle rear 18 and is fastened to a receiving part 21 or 22 that receives outer ends 23, 24 of a transverse support 25. The receiving part 21 or 22 and the corresponding side part 16, 17 are connected to each other releasably or nonreleasably, depending on whether the receiving part 21, 22 is to be designed as a body shell part or as a mounting part.

As shown in FIG. 1, the receiving part 21, 22 has an extension 26, 27 that is oriented in the vehicle vertical direction FH and protrudes over the respective side part 16, 17. A reinforced or cross-sectionally enlarged transverse support 25 therefore can be accommodated or fit higher up in the vehicle vertical direction FH so that inverted U-shaped roll bars 28, 29 placed onto the transverse support 25 protrude correspondingly higher over the vehicle supporting structure 1.

Each roll bar 28, 29 has inner and outer limbs 30 and 32. The inner limb 30 is fastened around the transverse support 25 by an inverted U-shaped foot 31 and the outer limb 32 is plugged into the receiving part 21 or 22 for connection. As seen in a top view, the receiving part 21, 22 is U-shaped and opens up to receive the respective outer limb 32 and also opens in to receive the ends 23 or 24 of the transverse support 25. Each receiving part 21, 22 also has a supporting foot 33 that lies below the respective extension 26, 27. The supporting foot 33 is supported on the body shell element 4 located therebelow and is connected releasably or nonreleasably thereto, depending on whether, as already mentioned, the receiving part 21, 22 is designed as a body shell part or as a mounting part. Accordingly, each receiving part 21, 22 can be designed as a unitary light metal cast part, as a multi-piece sheet-metal part or as an extruded profile.

The transverse support 25 spans the body shell element 4 in an arcuate manner and defines a hollow support with a closed cross-sectional profile. The hollow transverse support 25 can be a unitary light metal cast part, an assembly of sheet-metal or cast parts or a unitary extruded profile. At least the connecting components 9, 10 and the receiving parts 21, 22 of the transverse supporting structure 6 are separate parts. In the embodiment shown in FIG. 1, the multi-part transverse supporting structure 6 also forms a roll bar structure for the convertible in addition to being a transverse reinforcement between the two body pillars 2, 3.

Figure 2:
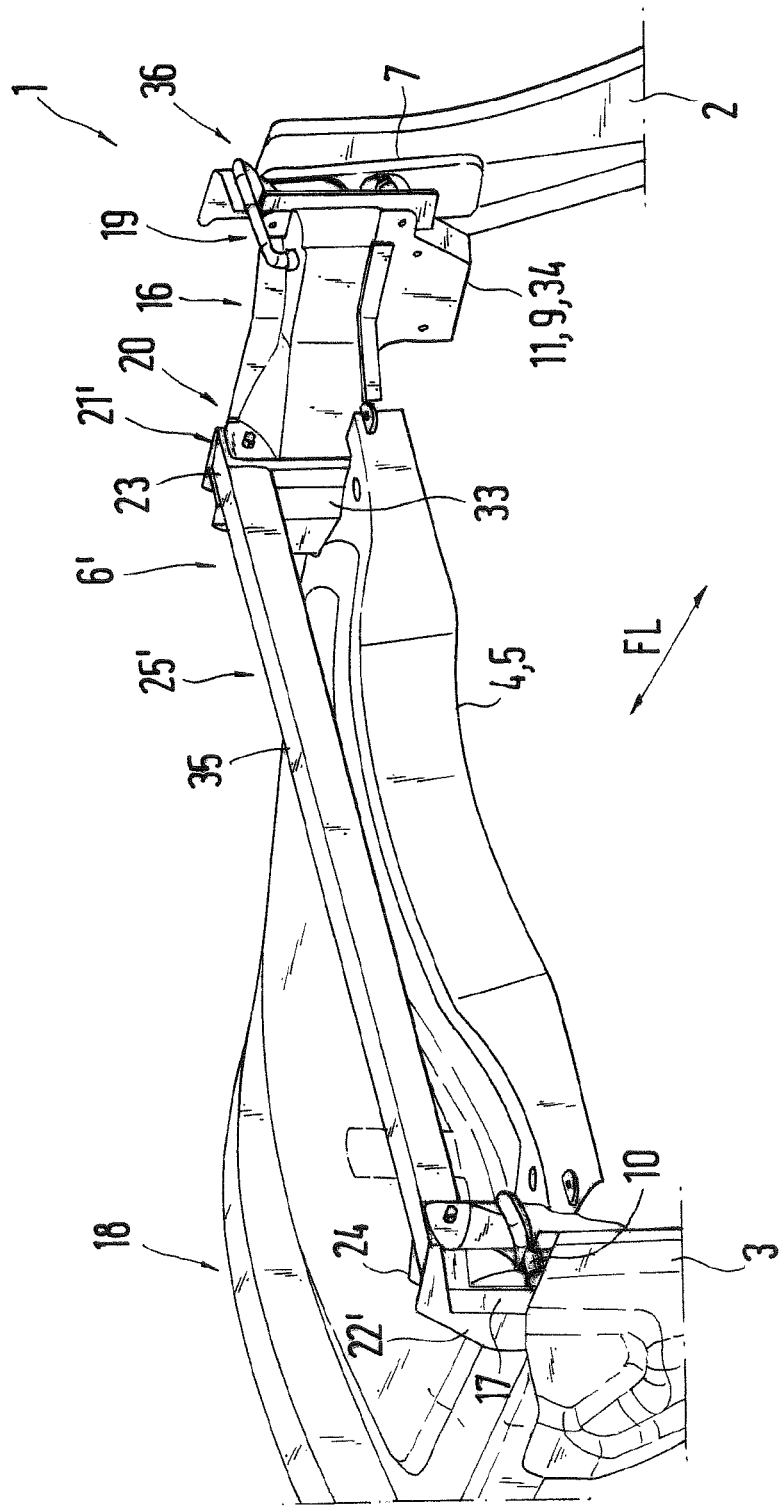
FIG. 2 is a side perspective view of a vehicle supporting structure with a transverse supporting structure for a closed passenger vehicle.

FIG. 2 shows the vehicle supporting structure 1 that has been modified to include an alternate transverse supporting structure 6'. Elements of the FIG. 2 embodiment that are the same as or similar to the FIG. 1 embodiment are not described again. In this respect, the only differences in the transverse supporting structure 6' over the transverse supporting structure 6 of FIG. 1 will be described below. The connecting components 9, 10 are merely spacer components 34 that bridge the distance between the first end 19 of the side part 16 and the inner side 7 of the body pillar 2. However, as described above, the connecting components 9, 10 could be designed as convertible top bearings, although this is not necessary for the embodiment of FIG. 2 since the transverse supporting structure 6' of FIG. 2 is provided for a vehicle having a fixed, immovable roof, i.e. for a closed passenger motor vehicle. The spacer component 34 has the inner and outer plates 13, 14 and the two walls that run in the vehicle transverse direction FQ (only the wall 12 is illustrated in FIG. 1). The side parts 16, 17 of the transverse supporting structure 6' are of identical design to the side parts 16, 17 of the transverse supporting structure 6. The receiving parts 21', 22' of the transverse supporting structure 6' are of identical design in the region of the supporting foot 33 to the receiving parts 21, 22. However, the receiving parts 21' 22' do not have the upwardly directed extension 26, and therefore end, as seen in the direction of the vehicle vertical axis FH, at the same level as the side parts 16. A transverse support 25' of the transverse supporting structure 6' is a hollow substantially rectilinear profile and has a smaller height, as measured in the direction of the vehicle vertical axis FH, than the transverse support 25 of FIG. 1. However, the ends 23, 24 of the transverse support 25' also are held in the respective receiving parts 21' and 22'. A releasable or nonreleasable connection can be provided for the connection of the receiving parts 21', 22' to the corresponding transverse support 25', depending on whether the transverse support 25' is provided as a body shell part or as a mounting part.

The transverse support 25' of FIG. 2 conceivably could be provided with the roll bars 28, 29 even though the receiving parts 21' and 22' shown in FIG. 2 are provided for the transverse supporting structure 6'. The roll bars 28, 29 could be of correspondingly higher design to compensate for the absent extension 26. However, the upper side 35 of the transverse support 25' illustrated in FIG. 2 preferably is provided with a luggage-securing means which is not shown here but which is known from FIG. 1 (reference number 51) in EP 1 728 707 A2. The arrangement of the transverse support 25' at a lower point than the transverse support 25 is advantageous insofar as a view to the rear in the case of a closed passenger motor vehicle hardly is obstructed.

Both FIGS. 1 and 2 also show a belt-deflecting means 36 which is fastened to the side part 16, 17 adjacent to each body pillar 2, 3. The belt-deflecting means 36 can be a curved bar about which the seat belt (not illustrated here) is guided.

Reception of the ends 23, 24 of the transverse supports 25, 25' in the receiving parts 21, 22, 21', 22' enable forces to be introduced better into the vehicle supporting structure 1 in the event of a side impact or in the event of a vehicle overturning. The transverse supporting structure 6, 6' can be connected to the vehicle supporting structure 1 with a releasable connection, such as, for example, a screw connection, in the direction of the vehicle transverse direction FQ. The transverse support 25, 25' and the receiving parts 21, 22, 21', 22' can be connected releasably with a releasable connection, such as, for example, a screw connection, in the direction of a vehicle longitudinal axis FL.

The transverse supporting structure 6 or 6' is made from separate parts. Hence, tolerances can be compensated for at the connecting points between the transverse support 6, 6' and the receiving parts 21, 22 or 21', 22' or between the corresponding receiving part 21, 22 or 21', 22' and side part 16, 17. If a transverse supporting structure 6, 6' is preassembled outside the vehicle, individual components of the transverse supporting structure 6, 6' initially can be screwed loosely to the adjacent parts and can be screwed down firmly only after being inserted into the motor vehicle supporting structure 1. However, it also is conceivable to mount individual components of the transverse supporting structure 6, 6' one after another in the vehicle supporting structure 1. A mixed construction, i.e. some parts are body shell parts and are accordingly assigned to the supporting structure 1, and other parts are mounting parts, would also be conceivable. The individual components of the transverse supporting structure 6, 6' are the two lateral connecting components 9, 10, the side parts 16, 17, the receiving parts 21, 22 or 21', 22' and the transverse support 25 or 25'.

The convertible top could be attached to the convertible top bearing 15 in the embodiment of FIG. 1, and therefore the convertible top and transverse supporting structure 6 could be fit between the body pillars 2, 3 as a premanufactured constructional unit. Alternatively, the convertible top initially could be fastened to the vehicle supporting structure 1 via the convertible top bearings 15 and the remaining parts 16, 17, 21, 22 and 25 subsequently could be connected to the vehicle supporting structure 1.

What is claimed is:

1. A vehicle supporting structure for a motor vehicle with opposite left and right body pillars, the vehicle supporting structure comprising:
   left and right side parts adjacent to the respective left and right body pillars and extending obliquely from the respective body pillar toward a vehicle rear;
   left and right convertible top bearings connecting the respective left and right side parts to the left and right body pillars respectively;
   left and right receiving parts at ends of the respective left and right side parts that face away from the respective left and right body pillars, each of the receiving parts having an extension projecting up in a direction of a vehicle vertical axis to height positions above the left and right side parts and the left and right convertible top bearings, the transverse support being connected to the extensions of the receiving parts;
   a transverse support having opposite left and right ends and defining a hollow closed profile extending from the left end to the right end, the opposite left and right ends of the transverse support being fastened respectively to the left and right receiving parts; and
   left and right roll bars, each of the roll bars having an outer limb connected to the respective left or right receiving part and an inner limb with an inverted U-shaped foot fastened around the transverse support.

2. The vehicle supporting structure of claim 1, wherein the transverse support spans a distance between the side parts in an arcuate manner.

3. The vehicle supporting structure of claim 1, wherein the receiving part further is connected to a body shell element located under the receiving part.

4. The vehicle supporting structure of claim 1, wherein each of the receiving parts ends at a height position approximately level with the side part, and the transverse support bears a luggage-securing means that projects into the vehicle interior.

5. The vehicle supporting structure of claim 1, further comprising a belt-deflecting means fastened to each side part.

6. The vehicle supporting structure of claim 1, wherein the left and right side parts adjacent to the respective body pillars are hollow supports as seen in top view.

7. The vehicle supporting structure of claim 1, wherein the left and right receiving parts are substantially U-shaped, each of the U-shaped receiving parts being open in directions facing one another for receiving the respective left and right ends of the transverse support and being open upward for receiving the outer limb of the respective roll bar.

8. A system of vehicle supporting structures for both convertible motor vehicles and closed top motor vehicle, each of the motor vehicles having opposed left and right body pillars, the system comprising:
   substantially identical left and right side parts for each type of vehicle, the left and right side parts being adjacent to the respective left and right body pillars and extending obliquely from the body pillars toward a vehicle rear;
   left and right connecting components connecting the respective left and right side parts to the left and right body pillars respectively, the connecting components defining a convertible top bearing when the motor vehicle is a convertible;
   left and right receiving parts at ends of the respective left and right side parts that face away from the respective first and second body pillars, the receiving parts having an extension projecting up in a direction of a vehicle vertical axis to height positions above the left and right side parts and the left and right connecting components when the motor vehicle is a convertible;
   substantially identical transverse supports for each type of vehicle, the transverse supports having opposite left and right ends and defining a hollow closed profile extending from the left end to the right end, the opposite left and right ends being fastened respectively to the left and right receiving parts; and
   left and right roll bars when the vehicle is a convertible, each of the roll bars having an outer limb connected to the respective left or right receiving part and an inner limb with an inverted U-shaped foot fastened around the transverse support when the vehicle is a convertible.

9. The system of claim 8, wherein the transverse supports span a distance between the side parts in an arcuate manner.

10. The system of claim 8, wherein the each of the left and right receiving parts further is connected to a body shell element located under the respective receiving part.

11. The system of claim 8, wherein the receiving parts end approximately level with the side parts when the vehicle is a closed top vehicle.

* * * * *